(12) United States Patent
Barnes et al.

(10) Patent No.: US 11,559,837 B2
(45) Date of Patent: Jan. 24, 2023

(54) SYSTEM AND METHOD FOR POWDER MANUFACTURING

(71) Applicant: Metal Powder Works, LLC, Sewickley, PA (US)

(72) Inventors: John E. Barnes, Sewickley, PA (US); Christopher B. Aldridge, Austin, TX (US)

(73) Assignee: Metal Powder Works, LLC, Clinton, PA (US)

( * ) Notice: Subject to any disclaimer, the term of this patent is extended or adjusted under 35 U.S.C. 154(b) by 196 days.

(21) Appl. No.: 16/375,168

(22) Filed: Apr. 4, 2019

(65) Prior Publication Data

US 2019/0308245 A1    Oct. 10, 2019

Related U.S. Application Data

(60) Provisional application No. 62/652,473, filed on Apr. 4, 2018, provisional application No. 62/652,483, filed on Apr. 4, 2018.

(51) Int. Cl.
*B22F 1/05* (2022.01)
*B22F 9/04* (2006.01)
(Continued)

(52) U.S. Cl.
CPC ............. *B22F 1/05* (2022.01); *B22F 1/052* (2022.01); *B22F 1/065* (2022.01); *B22F 9/04* (2013.01);
(Continued)

(58) Field of Classification Search
CPC ............ B22F 9/04; B22F 2304/10; B22F 2009/046; B22F 2998/10; B22F 1/0014;
(Continued)

(56) References Cited

U.S. PATENT DOCUMENTS

| 4,382,903 | A | | 5/1983 | Larsson et al. |
|---|---|---|---|---|
| 5,071,067 | A | | 12/1991 | Larsson |
| 5,761,779 | A | * | 6/1998 | Maruyama ............ B22F 1/0048 228/56.3 |
| 6,632,394 | B2 | | 10/2003 | Tornberg |
| 6,706,324 | B2 | | 3/2004 | Chandrasekar et al. |
| 7,628,099 | B2 | * | 12/2009 | Mann ........................ B22F 9/04 148/308 |

(Continued)

FOREIGN PATENT DOCUMENTS

| EP | 0457920 A1 | 11/1991 |
|---|---|---|
| JP | 9184002 A | 7/1997 |

(Continued)

OTHER PUBLICATIONS

Microtrac, "Total Solutions in Particle Characterization", Apr. 25, 2015, pp. 1-8 (Year: 2015).*

*Primary Examiner* — Keith Walker
*Assistant Examiner* — Adil A. Siddiqui
(74) *Attorney, Agent, or Firm* — The Webb Law Firm

(57) ABSTRACT

A powder production method includes providing an elongated workpiece and repeatedly contacting an outer surface of the elongated workpiece with a reciprocating cutter according to a predetermined at least one frequency to produce a powder. The powder includes a plurality of particles, wherein at least 95% of the produced particles have a diameter or maximum dimension ranging from about 10 μm to about 200 μm. A system for producing powders having a plurality of particles including a cutter and at least one controller is also provided herein.

21 Claims, 10 Drawing Sheets

(51) Int. Cl.
- *B33Y 70/00* (2020.01)
- *B22F 10/20* (2021.01)
- *B22F 9/08* (2006.01)
- *B22F 1/052* (2022.01)
- *B22F 1/065* (2022.01)
- *B33Y 10/00* (2015.01)

(52) U.S. Cl.
CPC .............. *B22F 9/082* (2013.01); *B22F 10/20* (2021.01); *B33Y 70/00* (2014.12); *B22F 2009/046* (2013.01); *B22F 2304/10* (2013.01); *B22F 2998/10* (2013.01); *B33Y 10/00* (2014.12)

(58) Field of Classification Search
CPC ............... B22F 1/0007; B22F 2999/00; B22F 2998/00; Y02P 10/25; C04B 35/622; C04B 2235/6026; B33Y 70/00; B29B 9/02; B23B 29/125; B23B 1/00; G05B 2219/37598; Y10S 82/904; Y10T 408/03; Y10T 82/10; Y10T 409/303808; Y10T 408/23

See application file for complete search history.

(56) References Cited

U.S. PATENT DOCUMENTS

| | | | |
|---|---|---|---|
| 7,895,872 B2 | 3/2011 | Mann et al. | |
| 2004/0253136 A1* | 12/2004 | Shamblen | C22C 1/04 419/34 |
| 2005/0211029 A1* | 9/2005 | Zurecki | B23Q 11/1053 82/1.11 |
| 2006/0251480 A1* | 11/2006 | Mann | B23B 37/00 408/1 R |
| 2007/0169325 A1* | 7/2007 | Jancso | B23C 5/16 29/56.5 |
| 2007/0199410 A1* | 8/2007 | Scholl | B22F 9/04 75/255 |
| 2011/0223833 A1* | 9/2011 | Rauscher | B24B 33/04 451/1 |
| 2018/0050431 A1 | 2/2018 | Kitakaze | |
| 2018/0133807 A1* | 5/2018 | Shamoto | B23B 1/00 |

FOREIGN PATENT DOCUMENTS

| | | |
|---|---|---|
| JP | 2001137738 A | 5/2001 |
| KR | 0142075 B1 | 2/1993 |
| RU | 2203773 C2 | 5/2003 |
| WO | 8905197 A1 | 6/1989 |

* cited by examiner

Powder Producing Machine

*Enter Target Particle Size*

| | Size (μm) | % |
|---|---|---|
| Particle 1 | 20 | 25 |
| Particle 2 | 40 | 50 |
| Particle 3 | 80 | 25 |

*Enter Powder Information*

Total Volume (cm³) 10.0
Total Mass (g) 270.0

*Enter Source Material Information*

Length (cm) 10          Diameter (cm) 1

Material: Aluminum / Stainless Steel / Nickel Alloy / Titanium

Morphology: Sphere / Platelet / Disc / Cylinder

Powder Producing Machine

*Cumulative Statistics*

Average Particle Volume (μm³) 33510
Average Particle Diameter (μm) 40
Sphericity 0.986

*Program / Powder Statistics*

Total Volume (cm³) 25
Total Mass (g) 167

*Time Remaining* 05 min 28 sec

*Percent Complete* 62%

FIG. 6B

SYSTEM AND METHOD FOR POWDER MANUFACTURING

CROSS REFERENCE TO RELATED APPLICATIONS

The present application claims priority to U.S. Provisional Patent Application No. 62/652,473, filed on Apr. 4, 2018, and to U.S. Provisional Patent Application No. 62/652,483, filed on Apr. 4, 2018, each of which is hereby incorporated by reference in its entirety.

BACKGROUND OF THE INVENTION

Field of the Invention

This disclosure is directed to systems and methods for powder manufacturing and, in particular, for systems and methods for manufacturing a powder including particles with a tight size distribution by mechanically attriting a source or feedstock with a reciprocating cutter.

Description of Related Art

Additive manufacturing processes, such as 3D printing or rapid prototyping, are gaining wide acceptance as a preferred way for producing designed parts quickly and with a high degree of precision. 3D printing machines are commercially available from a number of manufacturers including EOS Electro Optical Systems Group, SLM Solutions Group AG, Concept Laser GmbH, Arcam AB, Renishaw Plc, 3D Systems, Inc., ExOne Company LLP, Hewlett-Packard Co., and General Electric (GE Additive). Such additive manufacturing and 3D printing machines transform powders, usually metal powders, into manufactured parts, such as tools, dies, machines, automotive parts, decorative articles, and similar objects. The metal powders can comprise, for example, stainless steel, low-alloy steels, nickel alloys, titanium, and similar materials. In view of the widespread use of additive manufacturing processes, it is expected that the need for source material, such as metal powders, will continue to increase.

Powders for additive manufacturing are conventionally made by atomization techniques, such as by plasma atomization or gas atomization. Atomization generally produces a powder comprising particles with a wide range of sizes. In some cases, only about 20% to 40% of powder produced by such atomization processes are usable (e.g., a proper size and shape) for additive manufacturing. The remaining 60% to 80% of the powder is used for other applications, recycled, or discarded.

An exemplary atomization device for producing metal powder is disclosed in U.S. Pat. No. 6,632,394, which is incorporated by reference herein in its entirety. The atomization device includes a metallurgical vessel for holding a quantity of molten metal. The molten metal is introduced into an atomization chamber in the form of a metal stream, which passes into the atomization chamber through a nozzle element. In the atomization chamber, gas jets of different orientations come into contact with the molten metal stream, which breaks down the molten metal stream to form droplets that freeze into grains, thereby producing metal particles.

The '394 patent discloses that the atomization method produces a powder including particles ranging in size from 0 μm to 500 μm. About 75% of the formed particles were less than 100 μm in size. 34.9% of the produced powder was between 0 and 45 μm in size. Other exemplary atomization methods for forming powders having similar yields or particle size distributions are disclosed in U.S. Pat. No. 4,382,903 and International Patent Appl. Pub. No. 89/05197.

While particles as large as 150 μm can be used with some additive manufacturing machines, generally, additive manufacturing processes are performed using particles ranging in size from about 15 μm to about 100 μm. Often large portions of powder produced by atomization methods must be used for other applications, since the particles are too large or non-uniform and not suitable for additive manufacturing. Further, efficiency and speed of 3D printing machines can be affected by a flow rate of the powder particles into and through the machine. Powders including particles of substantially uniform size and shape generally have better flow characteristics and flow through the machines more easily. Accordingly, powder manufacturing processes for efficiently producing powders of uniform size and shape will improve operating efficiency of 3D printing machines.

SUMMARY OF THE INVENTION

In view of the inconsistent particle size distributions and lack of particle uniformity provided by current powder production methods, there is a need for devices and methods for producing powders with a narrow powder size distribution (PSD) and particle uniformity. Desirably, a large majority of produced particles should be suitable to use in additive manufacturing processes. There is also a need for methods for producing dense particles with low porosity and uniform shapes to improve operating efficiency of 3D printing machines. The devices and methods disclosed herein are designed to address such needs.

According to an aspect of the disclosure, a powder production method includes providing an elongated workpiece; and repeatedly contacting an outer surface of the elongated workpiece with a reciprocating cutter according to a predetermined at least one frequency to produce a powder. The powder includes a plurality of particles, wherein at least 95% of the produced particles have a diameter or maximum dimension ranging from about 10 μm to about 200 μm.

According to another aspect of the disclosure, a system for producing powders having a plurality of particles includes at least one cutter configured to contact an outer surface of an elongated workpiece to remove particles from the workpiece; at least one driver mechanically coupled to the at least one cutter configured to reciprocally move the cutter into contact with and away from the workpiece; and at least one controller. The at least one controller is electrically connected to the at least one driver and includes an input component. The controller is configured to cause the driver to move the cutter reciprocally into contact with and away from the workpiece according to one or more operating parameters received from the input component. The repeated contact between the workpiece and the cutter produces a powder having a plurality of particles. At least 95% of the plurality of particles have a diameter ranging from about 10 μm to about 200 μm.

According to another aspect of the disclosure, a method of producing metal powder includes rotating a wrought metal workpiece at a predetermined rate of rotation; repeatedly contacting an outer surface of the wrought metal workpiece at a predetermined frequency with a cutter having a cutter insert; and collecting particles produced by the contact between the cutter insert and the outer surface of the metal workpiece. The predetermined rate of rotation and the predetermined frequency are selected to obtain particles having a target particle size. At least 95% of the collected particles have a diameter or major dimension within 10% of the target particle size.

Examples of the present invention will now be described in the following numbered clauses:

Clause 1: A powder production method comprising: providing an elongated workpiece; and repeatedly contacting an outer surface of the elongated workpiece with a reciprocating cutter according to a predetermined at least one frequency to produce a powder comprising a plurality of particles, wherein at least 95% of the produced particles have a diameter or maximum dimension ranging from about 10 µm to about 200 µm.

Clause 2: The method of clause 1, wherein the elongated workpiece comprises a cast, wrought, or extrudable material.

Clause 3: The method of clause 1 or clause 2, wherein the elongated workpiece comprises a wrought metal rod.

Clause 4: The method of clause 3, wherein the wrought metal rod comprises one or more of steel, nickel, aluminum, titanium, platinum, rhenium, niobium, and alloys thereof.

Clause 5: The method of any of clauses 1-4, wherein the workpiece comprises at least one of uranium, rare earth elements, polymers, and ceramics.

Clause 6: The method of any of clauses 1-5, wherein at least 95% of the particles of the plurality of particles have a diameter within 10% of a target size.

Clause 7: The method of clause 6, wherein the target size comprises a diameter or maximum dimension ranging from about 15 µm to about 100 µm.

Clause 8: The method of any of clauses 1-7, wherein at least 95% of the particles of the plurality of particles have a diameter ranging from about 15 µm to about 100 µm.

Clause 9: The method of any of clauses 1-8, wherein at least 99% of the particles of the plurality of particles have a diameter ranging from about 15 µm to about 100 µm Clause 10: The method of any of clauses 1-9, wherein repeatedly contacting the workpiece with the cutter according to the predetermined at least one frequency comprises contacting the workpiece according to a first frequency for a predetermined first time period followed by contacting the workpiece according to a second frequency different from the first frequency for a predetermined second time period.

Clause 11: The method of clause 10, wherein repeatedly contacting the workpiece according to the first frequency produces a first plurality of particles, wherein at least 95% of the particles of the first plurality of particles have a diameter or major dimension within 10% of a first target size.

Clause 12: The method of clause 11, wherein repeatedly contacting the workpiece according to the second frequency produces a second plurality of particles, wherein at least 95% of the particles of the second plurality of particles have a diameter or major dimension within 10% of a second target size, which is different than the first target size.

Clause 13: The method of any of clauses 10-12, further comprising selecting a target particle size distribution comprising particles of the first target size and particles of the second target size and, prior to contacting the workpiece by the at least one cutter, determining the first time period and the second time period based on the selected particle size distribution.

Clause 14: The method of any of clauses 1-13, wherein producing the powder does not introduce porosity to the particles, such that the plurality of particles have a porosity substantially the same as a porosity of the elongated workpiece.

Clause 15: The method of any of clauses 1-14, further comprising rotating the workpiece at a selected rotation rate as the workpiece is contacted by the cutter, wherein the rotation rate is determined based on a target particle size to be produced.

Clause 16: The method of any of clauses 1-15, wherein repeatedly contacting the workpiece with the at least one cutter comprises contacting a first portion of the workpiece with a first cutter and contacting a second portion of the workpiece with a second cutter.

Clause 17: The method of any of clauses 1-16, further comprising, after the powder is produced, spheroidizing the plurality of particles by applying at least one of heat, abrasive forces, and chemical agents to the particles.

Clause 18: The method of any of clauses 1-17, further comprising exposing the workpiece to a laser while contacting the workpiece with the cutter to assist in removing the plurality of particles from the workpiece.

Clause 19: A system for producing powders comprising a plurality of particles, the system comprising: at least one cutter configured to contact an outer surface of an elongated workpiece to remove particles from the workpiece; at least one driver mechanically coupled to the at least one cutter configured to reciprocally move the cutter into contact with and away from the workpiece; and at least one controller electrically connected to the at least one driver comprising an input component, the controller being configured to cause the driver to move the cutter reciprocally into contact with and away from the workpiece according to one or more operating parameters received from the input component, wherein the repeated contact between the workpiece and the cutter produces a powder comprising a plurality of particles, and wherein at least 95% of the plurality of particles have a diameter ranging from about 10 µm to about 200 µm.

Clause 20: The system of clause 19, wherein the operating parameters comprise one or more of a rotation rate of the workpiece, a reciprocating frequency of the cutter, or an amplitude of the cutter relative to the workpiece.

Clause 21: The system of clause 19 or clause 20, further comprising a collection vessel configured to receive the plurality of particles formed by the repeated contact between the cutter and the workpiece.

Clause 22: The system of clause 21, wherein the collection vessel comprises a vacuum configured to draw the powder into the collection vessel.

Clause 23: The system of clause 22, wherein the collection vessel comprises one or more sensors electrically connected to the at least one controller, the one or more sensors being configured to measure characteristics of the produced powder, and wherein the at least one controller is configured to modify the one or more operating parameters of the at least one driver based on information detected by the one or more sensors.

Clause 24: The system of clause 23, wherein the one or more sensors are configured to detect at least one of: average particle volume, median particle volume, particle volume distribution, total powder weight, total powder volume, or average sphericity of the particles.

Clause 25: The system of any of clauses 19-24, wherein the at least one controller is configured to receive by the input component a target particle size and to automatically adjust the one or more operating parameters of the driver to produce particles of the selected size.

Clause 26: The system of clause 25, wherein the selected target particle size can be adjusted dynamically by a user while the driver is in operation.

Clause 27: A method of producing metal powder comprising: rotating a wrought metal workpiece at a predetermined rate of rotation; repeatedly contacting an outer surface of the wrought metal workpiece at a predetermined frequency with a cutter comprising a cutter insert; and collecting particles produced by the contact between the cutter insert and the outer surface of the metal workpiece, wherein the predetermined rate of rotation and the predetermined frequency are selected to obtain particles having a target particle size, and wherein at least 95% of the collected particles have a diameter or major dimension within 10% of the target particle size.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

BRIEF DESCRIPTION OF THE DRAWINGS

FIGS. 6A-6C show screens of a user interface for controlling and receiving feedback from a powder manufacturing system including the lathe device of FIG. 1A, according to aspects of the present disclosure.

DETAILED DESCRIPTION OF THE PRESENT INVENTION

Figure 1A:
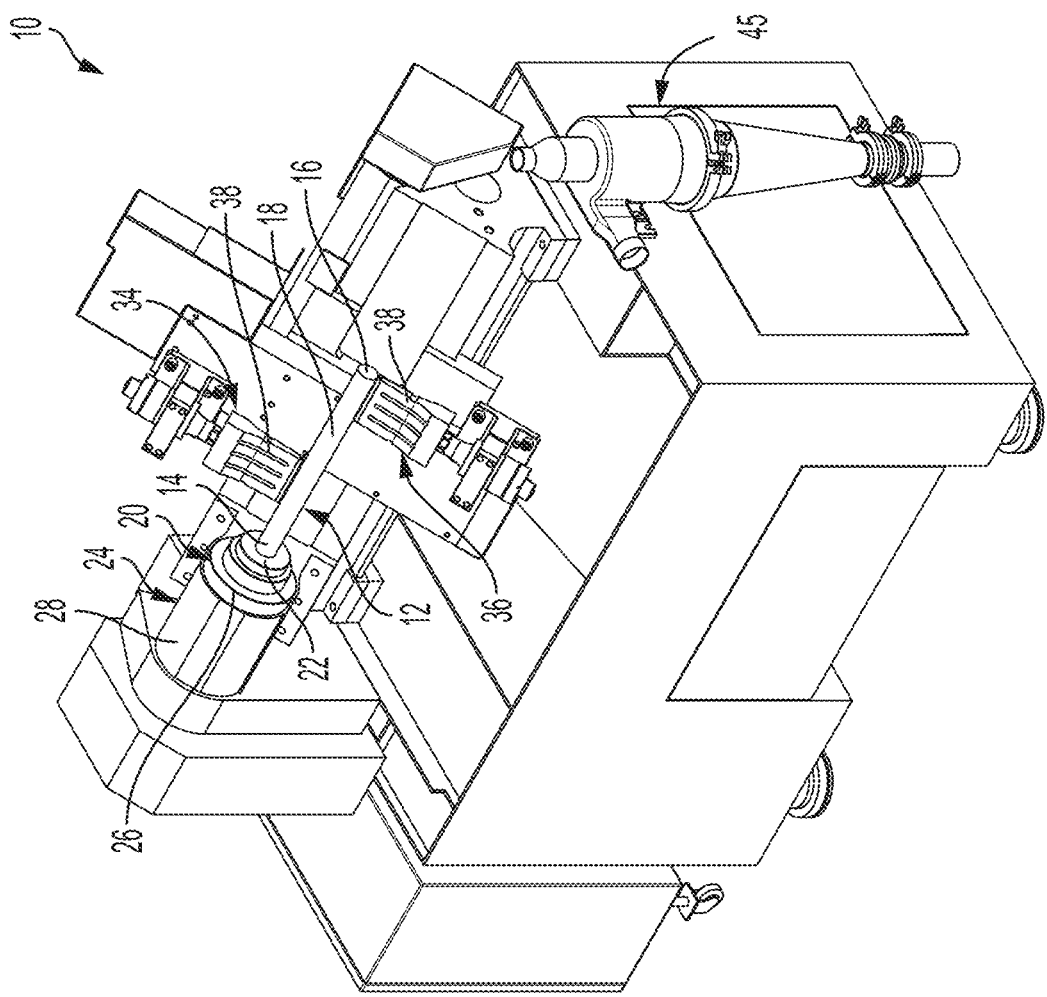
FIG. 1A is a perspective view of a lathe device for producing particles from an elongated member or workpiece according to an aspect of the disclosure.

For purposes of the following detailed description, it is to be understood that the invention may assume various alternative variations and step sequences, except where expressly specified to the contrary. Moreover, other than where otherwise indicated, all numbers expressing, for example, a size, diameter, or maximum dimension of a particle, as used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

As used herein, the singular form of "a", "an", and "the" include plural referents unless the context clearly dictates otherwise.

As used herein, the terms "top", "bottom", and derivatives thereof shall relate to the invention as it is oriented in the drawing figures. The term "proximal" refers to a portion of an object held by or mounted to another structure. The term "distal" refers to a portion of an object opposite from the "proximal" end thereof and, for example, can be a free portion or end of the object that is not held by or mounted to another structure. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

The present disclosure is directed to devices 10, methods, and control systems 100 for mechanically attriting or wearing down a source material or feedstock to produce a powder. The powder desirably includes particles suitable for additive manufacturing processes, such as for use with 3D printing and rapid prototyping machines. The powder can comprise particles formed from metal, ceramic, or polymer materials. Desirably, the device 10 provides greater control over particle size, morphology aspect ratio, density, porosity and other characteristics than can be provided by other manufacturing processes. Increased control over particle size and shape is believed to be especially useful for additive manufacturing processes, such as manufacturing processes performed with 3D printing and rapid prototyping machines. As discussed previously, such additive manufacturing processes generally require substantial quantities of powders comprising similarly sized particles with substantially uniform shapes.

In some examples, the device 10 can produce a powder with a narrow or tightly controlled powder size distribution (PSD). For example, produced powders can comprise a plurality of particles, wherein at least about 95% of the particles have a diameter or maximum dimension of less than 200 μm, and, preferably, at least 95% of the particles have a diameter or maximum dimension ranging in size from about 10 µm to about 200 µm. Theoretically, the device 10 could produce a powder in which at least 99% of the particles have a diameter or maximum dimension ranging from 15 µm to 100 µm. As used herein, "maximum dimension" refers to a longest straight-line distance between points on opposite sides of a particle along an axis of the particle and passing through a center of the particle. For example, for a spherical particle, the maximum dimension and diameter are the same. For cylindrical, ellipsoid, or rectangular shaped particles, the maximum dimension would be an axial length of the particle.

In some examples, at least 95% of particles of the powder can have a diameter or maximum dimension within 10% of the target size. Theoretically, the methods disclosed herein could provide a powder in which 95% of the particles have a diameter or maximum dimension within 1% of the target size. The target size can be, for example, an optimal target size for 3D printing. While not intending to be bound by theory, it is believed that an optimal size for 3D printing may be from about 15 µm to 100 µm, depending on the material and printing machine being used. For example, the device 10 can be used to produce a powder in which 95% of the particles produced have a diameter or maximum dimension of 45 µm±10%. The device 10 can also be used to produce powders including two or more target particle sizes. For example, a powder could be prepared in which 50% of the particles fall within a first narrow size range and 50% of the particles are within a second narrow size range different and separate from the first size range. For example, a powder could be produced in which 50% of the particles have a diameter or maximum dimension of 20 µm±10% and 50% of the particles have a diameter or maximum dimension of 80 µm±10%. The device 10 can produce the powder with the selected particle size or sizes. The user can change the desired particle size or shape easily merely by entering a new particle size into the system.

While not intending to be bound by theory, it is believed that particle shape or morphology is related to particle flow rate in additive manufacturing processes. In particular, it is believed that particles of certain uniform shapes flow more readily through 3D printing machines than do powders including particles having different or non-uniform shapes. The device 10 provides a mechanism for controlling particle morphology with a high degree of sensitivity. Accordingly, the device 10 can be used for producing particles optimized for increased flow rate in additive manufacturing processes.

Further, the device 10 can produce particles having a variety of morphologies and aspect ratios without introducing porosity. If the morphology of the formed particles is not satisfactory, the particles produced by the methods disclosed herein can be made to be more spherical by post-processing techniques. Further, particles produced by the methods disclosed herein generally have low porosity relative to particles produced by other methods. As used herein, "low porosity materials" are materials having an inner mass or bulk portion that is substantially free from pores, cavities, void spaces, openings, or crevices. In particular, since formation of particles by the device 10 does not introduce porosity, particles formed by the device 10 and methods disclosed herein have substantially the same porosity as the source material or workpiece 12. Particles formed by the device 10 are also denser than particles formed by atomization methods. In some cases, using denser particles for additive manufacturing can reduce or eliminate a need for post-processing of molded or printed articles to remove porosity. For example, molded articles made using the powders disclosed herein may not need to be processed by hot isostatic pressing, as is currently performed during additive manufacturing.

While not intending to be bound by theory, it is also believed that the devices 10 and methods disclosed herein produce powder particles having certain chemical advantages compared to particles formed by atomization. For example, the devices 10 and methods disclosed herein do not alter a phase composition of the source material or feedstock during formation of the powder. Accordingly, the devices 10 and methods disclosed herein can be used for forming powders from non-weldable materials, without additional processing steps required by atomization. Non-weldable materials can include high melting temperature metal alloys (e.g., 7000 Series Aluminum alloy) and engineered polymers with high melting temperatures. High melting temperature materials can be non-weldable because precipitates formed from such materials tend to re-dissolve into solution during heating or welding. In that case, the solution would need to be allowed to age to allow the precipitates to fall back out of solution. In a similar manner, atomization of high melting point materials also causes precipitates to dissolve into solution. In order to re-form the precipitates, some atomization processes re-melt the solution while others avoid melting the solution entirely (e.g., for binder jet and cold spray processes). In contrast, in one specific example, irregular shaped powders formed from a non-weldable alloy (e.g., 7000-series Aluminum) could be printed by a cold spray process. Beneficially, the phase composition of the powder particles is retained during the formation process. Phase composition would also be preserved during binder jetting, which is also a cold process.

Particle Producing Lathe Device

FIGS. 1A-2B show a powder producing lathe device 10 that produces particles from an elongated workpiece 12 formed from a bulk material. The lathe device 10 is configured to produce particles of a substantially uniform predetermined size or PSD from the workpiece 12 with a high degree of controllability. The workpiece 12 is generally an elongated member comprising a first or proximal end 14, a second or distal end 16, and an elongated body 18 extending between the proximal end 14 and the distal end 16. The workpiece 12 serves as a source of bulk material or feedstock configured to be mechanically attrited, cut, scraped, machined, hit, gouged, carved, or otherwise contacted to produce particles of a controllable size from the bulk material of the workpiece 12. The workpiece 12 is formed from a material capable of being wrought, cast, or extruded into an elongated member or rod. The material is generally of high or premium quality, and can be virgin material of known composition and without contaminants. In some examples, the material can be a recycled material. The material can be a metal material, such as steel, nickel, aluminum, titanium, platinum, rhenium, niobium, and alloys thereof. The material could be a high performance or high melting point alloy, such as 7000-series Aluminum. In other cases, the workpiece 12 can comprise uranium, rare earth elements, polymers, and ceramics. For example, the material could be an engineered polymer such as Torlon® polyamide-imide, manufactured by Solvay S. A. In some examples, materials that have precipitate reinforced strengtheners, which would be affected by atomizing, can be used with the devices 10 and methods disclosed herein without posing a challenge.

In some examples, the lathe device 10 comprises a retainer assembly 20 configured to receive and securely hold the proximal end 14 of the workpiece 12 during formation of the particles. For example, the retainer assembly 20 can comprise an annular locking structure 22, such as a structure comprising clamps, jaws, clasps, vises, or similar connectors configured to receive and cinch around the proximal end 14 workpiece 12 to hold the workpiece 12 in place. In some examples, the retainer assembly 20 further comprises or is coupled to a drive mechanism or driver 24 configured to turn the workpiece 12 at a selected rotation rate. For example, the driver 24 can comprise a rotating spindle 26 mechanically coupled to rotating belt or drive shaft 28. The belt or drive shaft 28 can be coupled to and driven by a motor 30 (shown in FIG. 2A). When in use, rotation of the motor 30 is transferred to the workpiece 12 via the belt or drive shaft 28. In some examples, the motor 30 causes the workpiece to fully rotate in, for example, a direction of arrow A1 (shown in FIGS. 2A and 2B). Alternatively, the workpiece 12 can be made to oscillate in a back and forth manner. For example, the drive mechanism 24 may cause the workpiece 12 to rotate 90° or more in a first direction (shown by arrow A1) and then to rotate 90° or more in a second direction (shown by arrow A2). In some examples, the driver 24 can further comprise a linear actuator 32 for moving the workpiece 12 back and forth in an axial direction (shown by arrow A3) to expose a greater portion of the surface area of the workpiece 12 surface to a cutter assembly 34, 36, as described in further detail herein.

The lathe device 10 further comprises the cutter assembly 34, 36 or tool holder including a cutter 38 configured to contact the body 18 of the workpiece 12 to produce the particles. The cutters 38 can have a variety of shapes and configurations depending on the size and shapes of the particles being produced. For example, the leading edge of the cutter 38, which contacts the workpiece 12, can be, for example, flat, triangular shaped, or rounded. It is believed that different shaped cutters 38 produce particles having different morphologies.

Figure 3B:
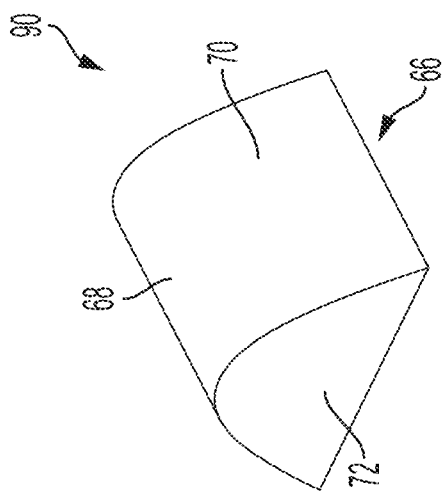
FIGS. 3A-3C are perspective views of examples of particles produced from cutters with different geometries, according to aspects of the present disclosure.
Figure 3C:
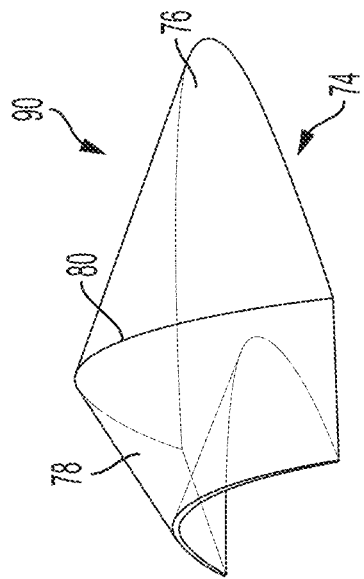
Figure 3A:
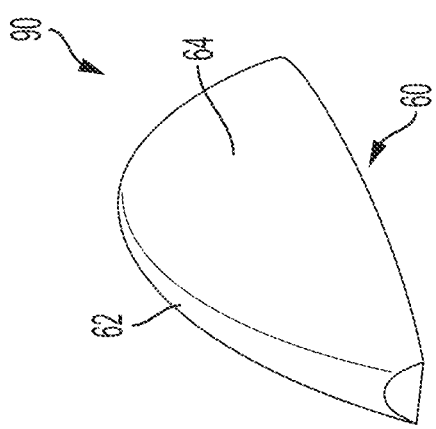

A number of examples of particles produced by cutters 38 with different shapes are shown in FIGS. 3A-3C. FIGS. 3A-3C are intended to demonstrate how different shaped cutters 38 produce particles having different morphologies. For example, a particle 90 in FIG. 3A is produced by a cutter 38 with a rounded leading edge. As shown in FIG. 3A, the particle 90 comprises a round or elliptical base 60 extending to a rounded tip 62. The particle 90 further comprises opposing curved sides 64 extending between the base 60 and tip 62. In particular, the rounded cutter 38 produces curved sides 64, which curve in multiple dimensions or directions.

FIG. 3B is an example of a particle 90 formed by a cutter 38 with a flat leading edge. The particle 90 includes a rectangular base 66 extending to a rounded tip 68. The particle 90 in FIG. 3B further comprises a curved surface 70 extending from the base 66 to the tip 68. The curved surface 70 curves in one direction or dimension. Further, the particle 90 includes opposing flat sides 72 formed by the flat face of the cutter 38.

FIG. 3C shows a particle 90 formed by a cutter 38 with a triangular tip. The particle 90 comprises an arcuate base 74. The particle 90 further comprises curved surfaces 76, 78 extending from the base 74 towards a center edge 80. Generally, the triangular tip produces the hard or center edge 80 on the particle 90, resulting in a more complex shape than is provided by the round or flat cutters 38 described previously. Other cutter designs including more complex arrangements of grooves, ridges, protrusions, and surfaces can also be used with the lathe device 10, within the scope of the present disclosure, to impart more complex morphologies to powder particles.

In some examples, the cutter assembly 34, 36 can contact the workpiece 12 in a variety of positions or orientations. For example, the cutter assembly 34, 36 can be capable of rotating or tiling relative to the workpiece 12 to adjust the contact position. Adjusting the contact position can produce particles having different morphologies. Accordingly, the adjustability of the cutter assembly 34, 36 can provide greater control over morphology of produced particles and, in particular, can allow for greater sensitivity and selectivity in the shapes of the particles being produced.

In some examples, multiple cutter assemblies 34, 36 can be configured to contact the workpiece 12 to form a single particle. For example, during a first pass, a cutter assembly 34 could contact the workpiece 12 to produce a certain texture pattern or arrangement of grooves and ridges to the surface of the workpiece 12. The same or a second cutter assembly 36 could then contact the surface of the workpiece 12 during a second pass to produce the particles from the textured or grooved surface of the workpiece 12. Forming particles in multiple passes provides greater control over particle shape and, in some instances, can allow the lathe device 10 to produce particles with unique morphologies that could not be created in a single pass.

In some examples, the lathe device 10 can include two or more cutter assemblies 34, 36 configured to contact different portions of the workpiece 12 to improve productivity and efficiency. Efficiency is especially important when adapting the lathe device 10 for industrial applications. For example, in order to be effective for industrial applications, the lathe device 10 may need to be able to produce 100 kg of powder or more within a reasonable period of time. For example, the lathe device 10 can comprise a first cutter assembly 34 spaced axially apart along a length of the workpiece 12 by a distance D1 from a second cutter assembly 36. In some examples, the cutters 38 of the two cutter assemblies 34, 36 each contact the same circumferential position of the workpiece 12 (e.g., cutters 38 of the assemblies 34, 36 can be positioned to contact the workpiece 12 at, for example, a 3 o'clock or 90 degree position). In other examples, the two cutter assemblies 34, 36 can contact the workpiece 12 at different circumferential positions. For example, the first cutter assembly 34 could contact the workpiece at a 3 o'clock position and the second cutter assembly 36 could contact the workpiece at a 9 o'clock position.

The cutter assemblies 34, 36 can further comprise at least one reciprocating driver or drive mechanism 40 mechanically coupled to the at least one cutter 38 by, for example, a reciprocating rod or resonant structure 42. For example, the resonant structure 42 can be a tuned sonotrode that is excited to a frequency of, for example, 20 kHz. The drive mechanism 40 is configured to reciprocally move the cutter 38 into contact with and away from the workpiece 12 in a direction of arrow A4 (shown in FIGS. 2A and 2B). For example, the drive mechanism 40 can be configured to move the cutter 38 at a low ultrasonic frequency of about 10 kHz to about 30 kHz, and preferably at about 20 kHz. In other examples, the cutter 38 can be configured to operate at a higher frequency of about 30 kHz to 40 kHz or more. Also, the drive mechanism 40 is configured to move the cutter 38 towards and into the workpiece 12 according to a selected amplitude or depth. As used herein, the "amplitude" of the cutter 38 refers to how far the cutter 38 moves during each oscillation or cycle. The greater the amplitude, the farther the cutter 38 is driven into the workpiece 12. Driving the cutter 38 farther into the workpiece 12 produces larger particles. Also, as described in greater detail herein, the amplitude or movement of the cutter 38 may need to be adjusted during operation of the lathe device 10 to account for changes in geometry of the workpiece 12. For example, a diameter of the workpiece 12 decreases as the particles are being formed. Therefore, in order to continue providing consistently sized particles, position of the cutter 38 or workpiece velocity must be updated in accordance with the change in workpiece 12 diameter D5. The lathe device 10 and control system 100 disclosed herein can be configured to automatically account for such changes in workpiece 12 diameter D5.

The lathe device 10 can further comprise a powder collection system 45 comprising, for example, a collection vessel or hopper 44 (shown in FIGS. 2A and 2B) for receiving the particles formed by contact between the cutters 38 and the workpiece 12. In some instances, the hopper 44 can be gravity fed, meaning that the particles formed from the workpiece 12 fall into the hopper 44 by gravity. In other examples, the powder collection system 45 can comprise various suction or vacuum assemblies for drawing particles into the hopper 44. For example, a suction or vacuum pump 46 (shown in FIGS. 2A and 2B) could be provided to draw particles away from the workpiece 12 and into the hopper 44. Suction can also be used for emptying the hopper 44 once a sufficient amount of powder has been produced. For example, suction could be used to draw particles out of the hopper 44 and into another storage container through a drain or outlet port.

In some examples, the lathe device 10 further comprises one or more radiation sources 48 (shown schematically in FIG. 2A) configured to direct one or more radiation beams towards the workpiece 12. For example, the radiation source 48 can be a laser beam. It is believed that applying radiation to the workpiece 12 in proximity to portions of the workpiece 12 being contacted by the cutters 38 assists in or enhances removal of particles from the surface of the workpiece 12. For example, a laser beam can be directed to the workpiece 12 to soften or weaken surfaces of the workpiece 12. Processing the surface of the workpiece 12 in this manner can reduce the force which must be applied by the cutter 38 to separate the particles from the workpiece 12.

Powder Production Method

Figure 4:
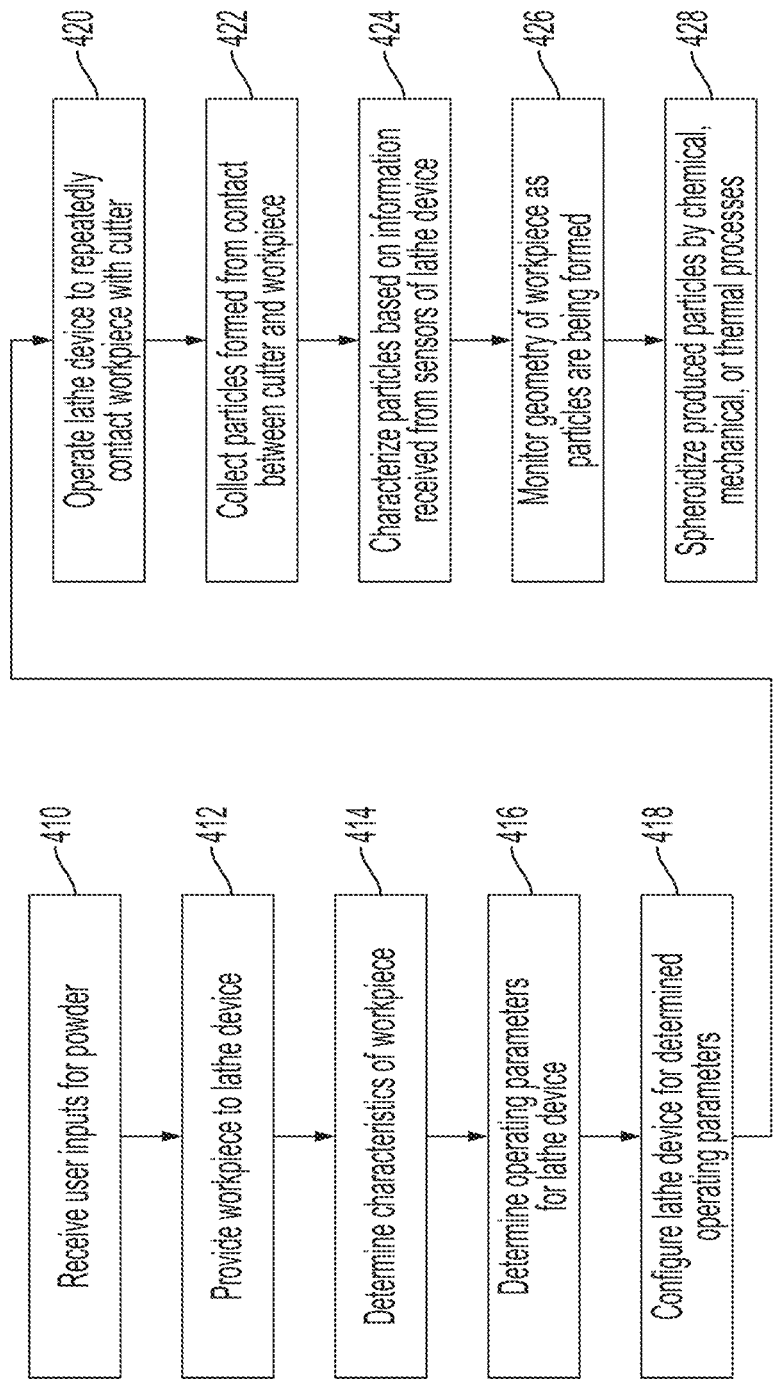
FIG. 4 is a flow chart showing steps of a method for producing particles using a lathe device according to an aspect of the disclosure.

Having described the lathe device 10 and workpiece 12, a method for producing a powder using the lathe device 10 will now be described in detail. A flow chart of steps for performing the method of producing the powder is shown FIG. 4. In some instances, many of the steps of the method of FIG. 4 are performed automatically by an automated control system associated with the lathe device 10. In particular, many of the steps for selecting and adjusting operating parameters of the lathe device 10 can be performed automatically. In some instances, a user may provide an instruction to the controller or control system about a powder to be formed. For example, the user may manually enter a target size, size distribution, or PSD for the powder to be formed. The user could also enter a total volume or mass of powder to be produced. In that case, the controller or control system can be configured to calculate operating parameters or a program for producing the powder with the selected characteristics and issue operating instructions to the lathe device 10 to perform the program. Once the specified amount of powder is produced and the program is completed, the controller or control system can be configured to turn off the driver 24 and, in some instances, provide a notification to a user that production of the powder has been completed.

In other examples, some aspects of the method can be performed or controlled manually. For example, the user can manually enter operating parameters for the lathe device 10, turn on the lathe device 10 to begin producing the powder, and, when a sufficient amount of powder has been produced, manually turn off the lathe device 10.

The powder production method can initially include, at step 410, receiving or determining inputs for the powder to be produced. As discussed previously, the inputs could include a target particle size or powder size distribution (PSD). The inputs could also include information about the workpiece, such as the type of material, density of the material, mass of the workpiece, length, diameter, or any other characteristics needed to control operation of the lathe device 10. The inputs could also include information about how much (e.g., a total mass or volume) powder should be produced.

Figure 1B:
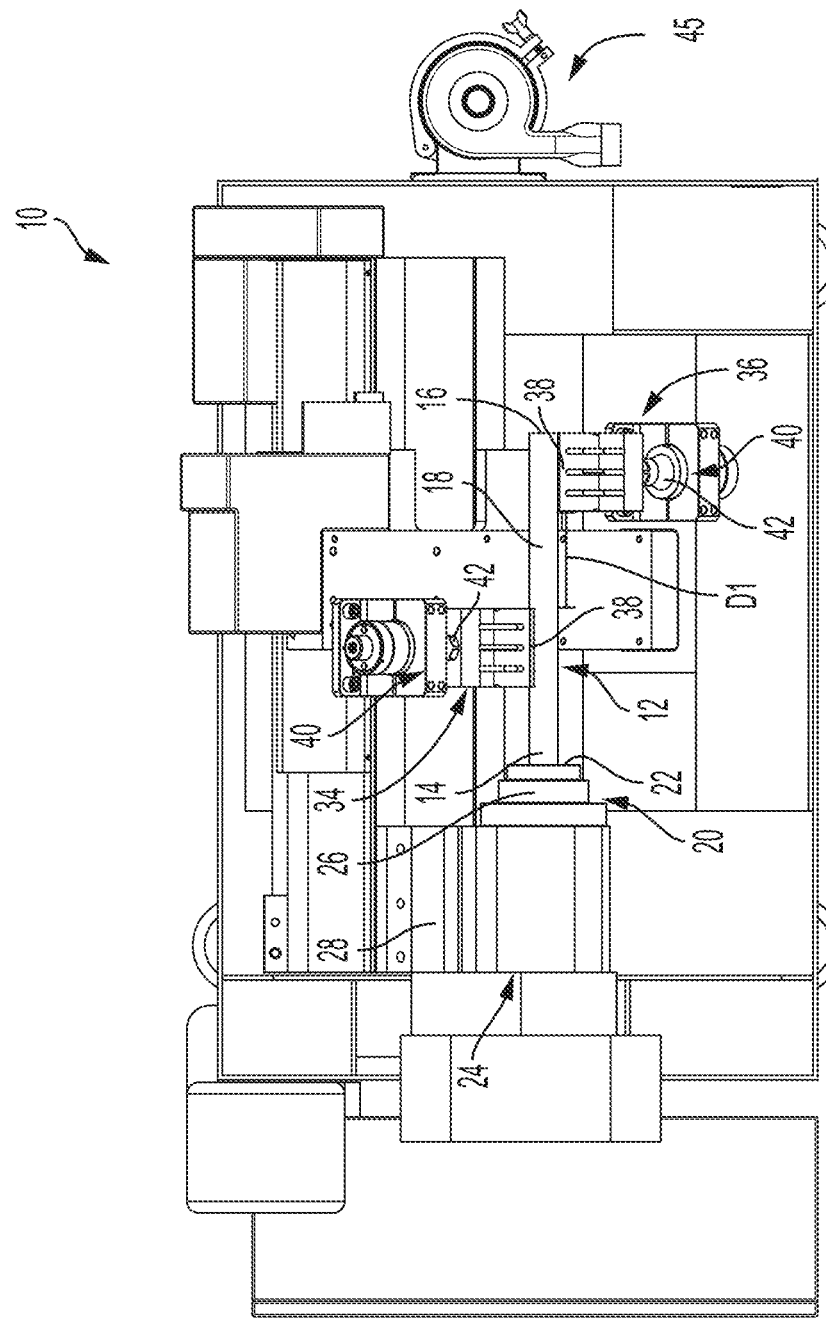
FIG. 1B is a top view of a portion of the lathe device of FIG. 1A.
Figure 2A:
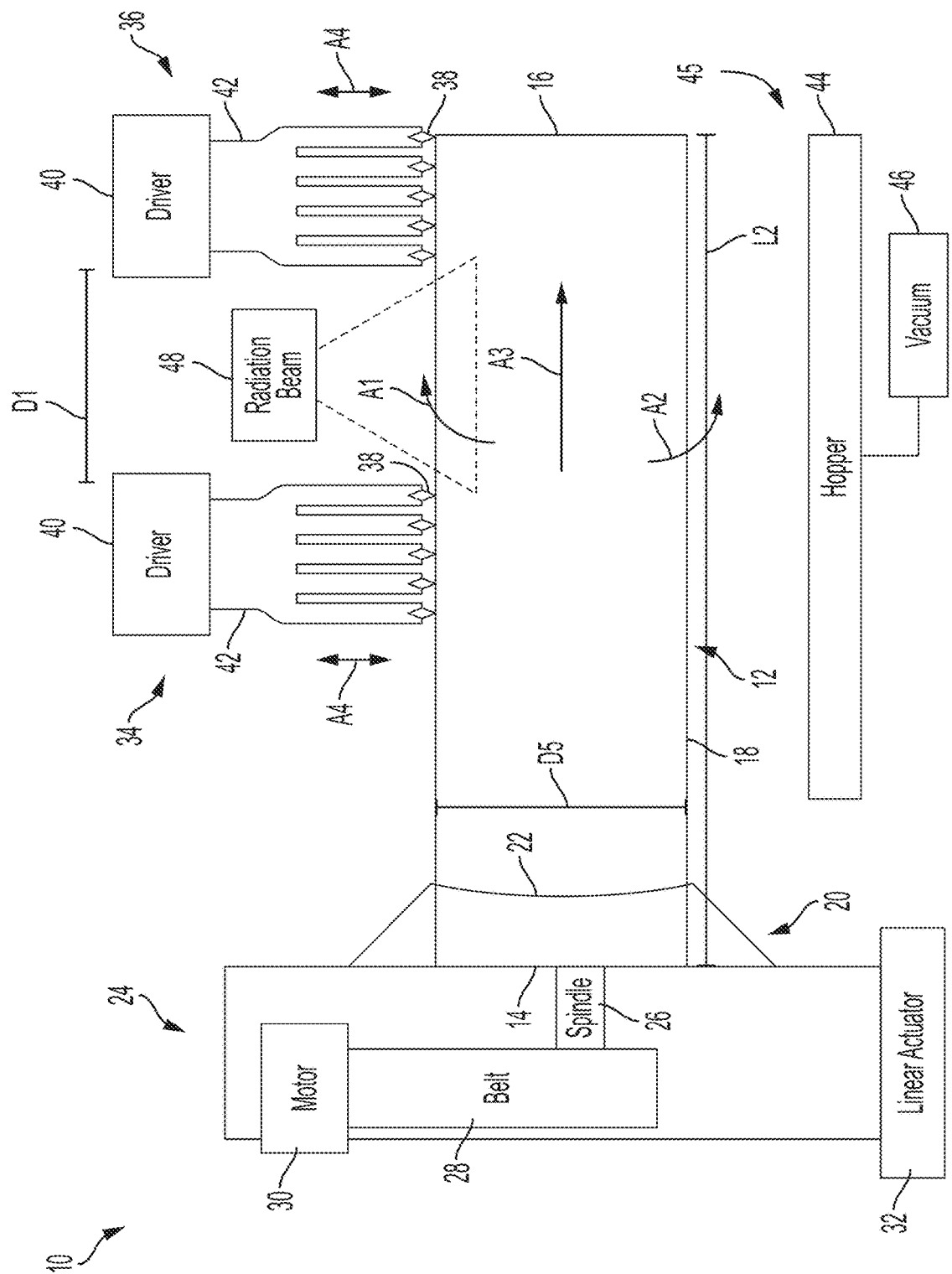
FIG. 2A is a schematic drawing of a side view of the lathe device of FIG. 1A performing a process for generating the particles, according to an aspect of the disclosure.
Figure 2B:
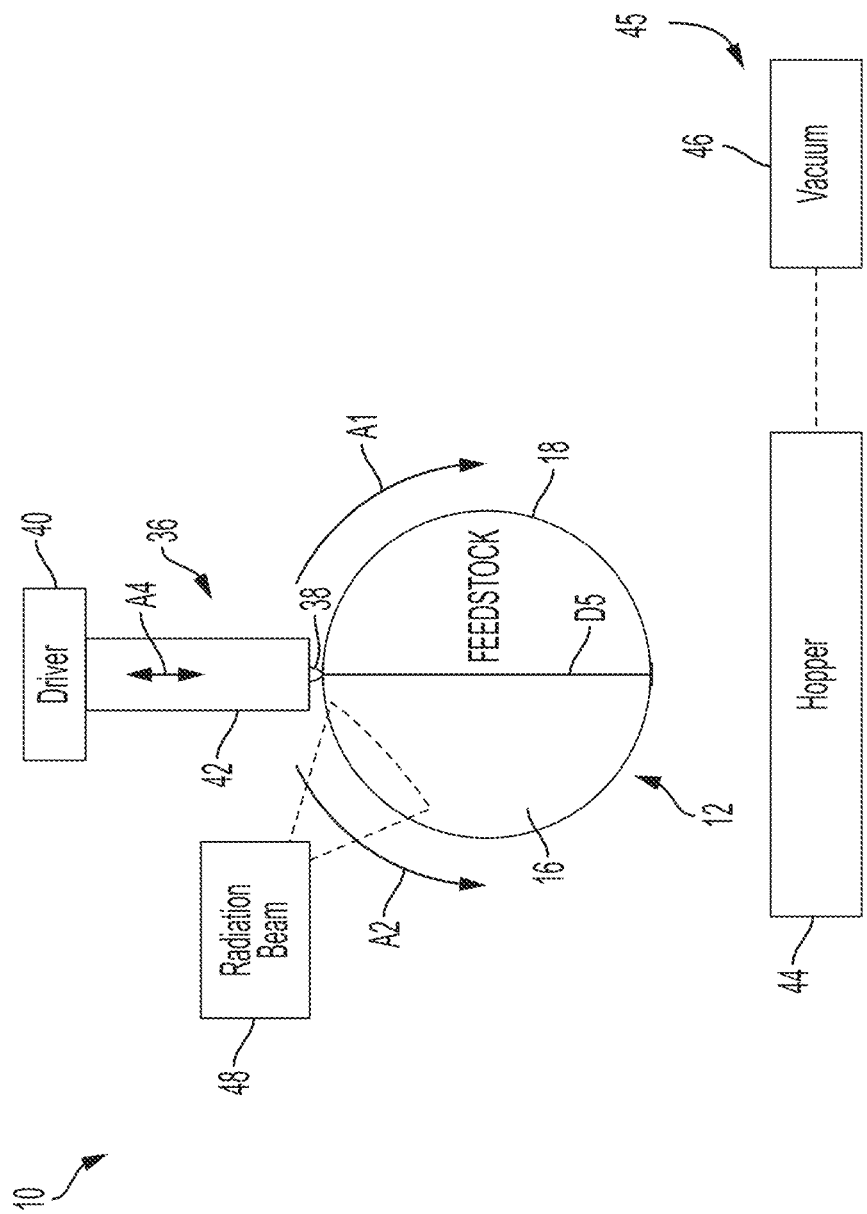
FIG. 2B is a schematic drawing of a front view of the lathe device of FIG. 1A.

At step 412, the elongated workpiece 12 is provided to the lathe device 10. As discussed previously, the workpiece 12 is generally an elongated member or rod formed from a material which is capable of being cast, wrought, or extruded. In some examples, providing the workpiece 12 includes cutting the workpiece 12 to a suitable length for use with the lathe device 10 and inserting an end 14 of the workpiece 12 into the retainer assembly 20 of the lathe device 10, as shown in FIGS. 1A and 1B.

At step 414, characteristics of the workpiece 12 can be determined. In most cases, such determinations will occur automatically. For example, the lathe device 10 can be configured to scan the workpiece 12 to determine a geometry of the workpiece 12. In order to scan the workpiece 12, the lathe device 10 can include one or more optical sensors that obtain images of the workpiece 12. The images can be processed to determine, for example, a length L2 and diameter D5 (shown in FIGS. 2A and 2B) of the workpiece 12. As described in detail herein, the length L2 and the diameter D5 of the workpiece 12 can be used to control movement of the cutter assemblies 34, 36. For example, diameter D5 can be relevant for determining an amplitude for the cutter assemblies 34, 36. In other examples, information about the geometry of the workpiece 12 can be provided to the lathe device 10 by the user. For example, a user can manually enter information about the workpiece 12 length, diameter, shape, and other features for processing by the control system 100.

At step 416, the method further comprises determining operating parameters for the lathe device 10 based on the inputs for the powder to be produced (e.g., particle size and total volume or mass of the powder) and determined geometry of the workpiece 12. The operating parameters of the lathe device 10 can include, for example, a reciprocating rate or frequency of the cutter assembly 34, 36 and amplitude of the cutter 38 relative to the workpiece 12. Operating parameters could also include a rate of rotation or rate of axial movement of the workpiece 12 controlled by the retainer assembly 20. In some examples, the operating parameters can be obtained from a look-up table or calculated from a calibration curve or calibration equation, which provides optimized operating parameters for the lathe device 10 for a given particle size and workpiece diameter. Values in the lookup table and/or the calibration curve can be experimentally determined. Alternatively, such values can be mathematically derived using, for example, computer modeling software for modeling the workpiece 12 and cutters 38.

Once operating parameters to achieve the target particle size or distribution are determined, at step 418, the lathe device 10 can be automatically or manually configured to execute a program or instructions for producing particles at the determined operating parameters. For example, the control system 100 could be configured to automatically adjust the operating parameters of the lathe device 10 for the determined parameters. In other examples, the user may manually select or enter operating parameters for the lathe device 10 using an appropriate interface device.

At step 420, the method further comprises a step of repeatedly contacting an outer surface of the elongated workpiece 12 with the reciprocating cutter 38 to produce the particles. In particular, the lathe device 10 may operate the drive mechanisms 24, 40 of the retainer assembly 22 and cutter assemblies 34, 36 according to the operating parameters to form particles of a desired size and shape. In particular, the cutter assemblies 34, 36 can operate at a sufficient frequency to produce the particles of the specified size and shape. In some examples, as discussed previously, the retainer assembly 20 of the lathe device 10 rotates the workpiece 12 as it is being contacted by the cutter 38. Rotating the workpiece 12 exposes different portion of the surface of the workpiece 12 to the cutter 38. Advantageously, exposing different portions of the workpiece 12 to the cutter 38 helps to ensure that the workpiece wears evenly during the production process.

At step 422, particles produced from the contact between the cutter 38 and workpiece 12 are collected in the collection vessel or hopper 44 of the lathe device 10. For example, as discussed previously, particles from the workpiece 12 could fall into the collection vessel or hopper 44 by gravity. In other examples, suction or vacuum systems can be used to draw the produced particles into the collection vessel or hopper 44.

At step 424, the collected particles can be characterized by sensors located in the collection vessel 44. For example, sensors can be used to detect particle size, shape, and other characteristics. In some cases, the detected characteristics can be compared to the user inputs received in step 410. If the collected particles differ from the received inputs, operating parameters of the lathe device 10 can be dynamically adjusted to account for such differences. For example, if particles are too small, the cutter amplitude can be increased and/or the rotational frequency can be increased so that larger particles will be produced.

In some examples, operating parameters of the lathe device 10 can be adjusted dynamically while the lathe device 10 is in use. For example, the lathe device 10 may be set with initial operating parameters for an initial or first period. After the initial or first period, the operating parameters can be changed causing the lathe device 10 to produce particles of another size or shape. In this way, the lathe device 10 can be used to produce a powder in which a substantial portion of particles fall within two or more separate target particle sizes or size ranges. For example, as described previously, a powder could be produced in which 50% of the particles fall within a first range (e.g., particles having a diameter of 20 µm to 30 µm) and 50% of the particles are within a second range (e.g., 70 µm to 80 µm). In some cases, a small portion of formed particles may not fall within either range.

At step 426, the method can further comprise monitoring the workpiece 12 as the particles are being produced. For example, the lathe device 10 and control system 100 can be configured to track changes in geometry of the workpiece 12 due to the repeated contact with the cutter 38. As discussed previously, as the particles are being produced, the diameter of the workpiece 12 can decrease. The method can include periodically updating operating parameters of the lathe device 10 to account for such changes in the diameter of the workpiece 12. Also, the workpiece 12 can be monitored to ensure that the workpiece 12 wears evenly and substantially maintains a cylindrical shape. If it is determined that the workpiece 12 is not wearing evenly, the cutter assemblies 34, 36 can be moved to contact different areas of the workpiece 12 to encourage more even wearing.

At step 428, in some examples, after the powder is produced, the method optionally further comprises spheroidizing the plurality of particles by applying, for example, heat and/or abrasive forces to the particles. As used herein, spheroidization refers to any of a number of chemical, thermal, or mechanical processes for affecting a shape of a formed particle to more closely resemble a sphere. Spherical particles generally have a better flow rate than non-spherical particles, especially for fine particles. Fine particles generally flow poorly compared to larger particles. Making the fine particles spherical improves the flow rate. Also, while the device 10 and method disclosed herein are not believed to introduce surface contaminants to the particles, spheroidizing particles would also purify the particles and/or release any contaminants, if present, from the surface of the particles.

While not intending to be bound by theory, it is believed that highly uniform spherical particles may be preferred for certain additive manufacturing processes. Particularly, spherical particles are often preferred in industry for use with currently available laser powder bed processes. Other additive manufacturing processes can be morphology insensitive or may prefer non-spherical particles. As discussed previously, the different cutting assemblies 34, 36 can be used to obtain certain non-spherical shapes. Also, other processing techniques could be applied to the formed particles to obtain other non-spherical particle morphologies.

Powder Production System

Figure 5:
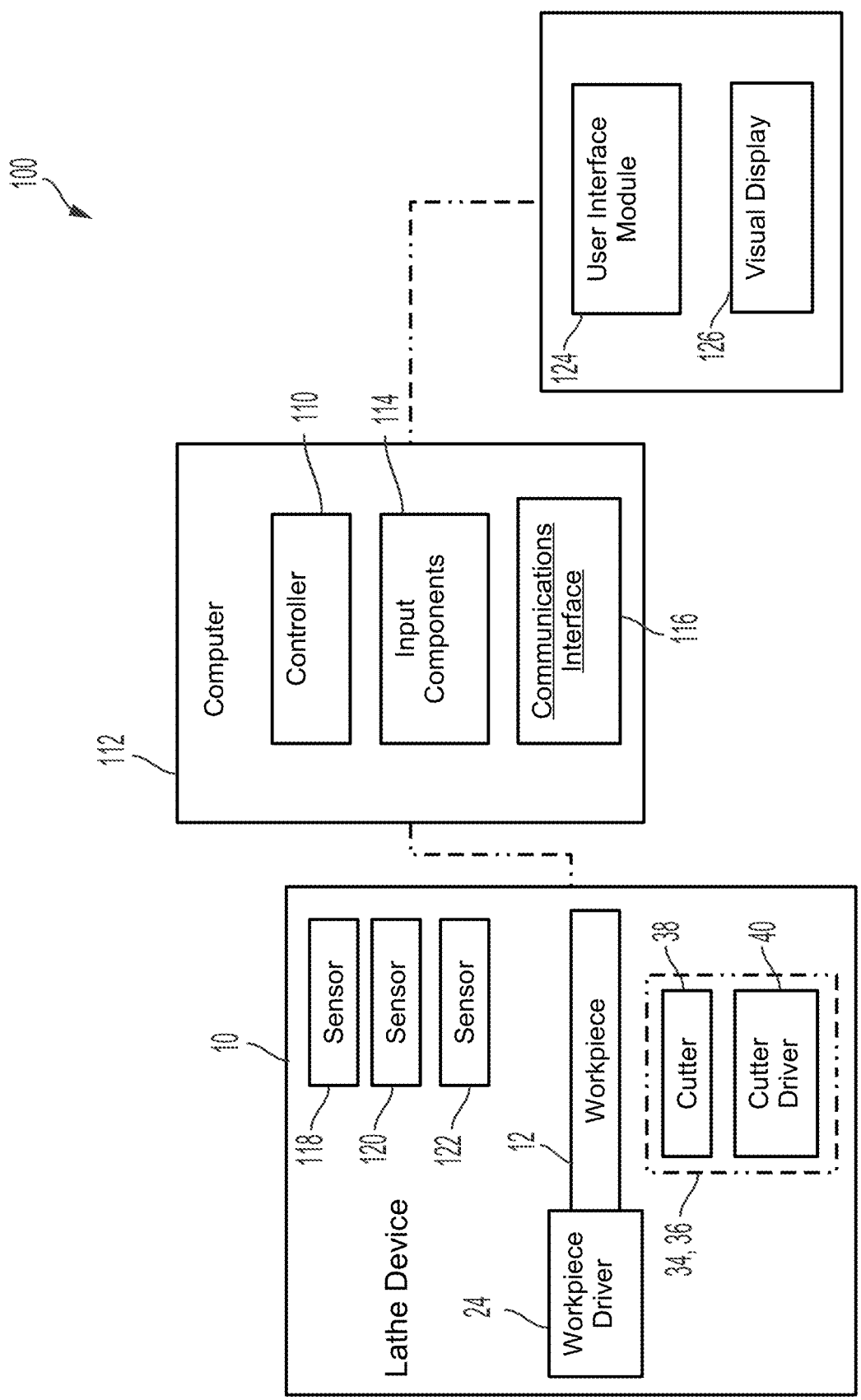
FIG. 5 is a schematic drawing of a system for generating a powder according to an aspect of the disclosure.

Having described features of the lathe device 10 and powder producing method, electrical components of a control system 100 for controlling the lathe device 10 to produce the powder will now be described in detail. A schematic drawing of the system 100 is shown in FIG. 5. The system 100 comprises the lathe device 10 including the workpiece 12 configured to be contacted by the cutters 38 to produce particles. The system 100 further comprises a controller 110 electrically coupled to electromechanical components of the lathe device 10. For example, the controller 110 can be electrically coupled at least to the drive mechanism or driver 24 of the retainer assembly 20 and the reciprocating drive mechanism 40 of the cutter assemblies 34, 36. The controller 110 can be a computer processor of the lathe device 10 or a processor of a separate electronic device in wired or wireless communication with the lathe device 10. For example, as shown in FIG. 5, the controller 110 can be associated with a portable or stationary computer device 112, such as a computer tablet, terminal, laptop, desktop, or similar computer device as is known in the art.

The controller 110 can also be coupled to one or more input components 114 for receiving user selections and operating instructions. For example, the input component 114 can comprise buttons and/or a touch screen display of the lathe device 10. In other examples, the input component 114 could be a keyboard, mouse, touch screen display, or similar data entry accessory of the portable or stationary computer device 112. In other examples, the input component 114 can be a wired or wireless communications interface 116 configured to receive instructions from remote electronic devices and networks. For example, users may enter instructions using a remote computer device. The entered instructions can be transmitted to and received by the controller 110 over the communications interface 116.

In some examples, the at least one controller 110 receives operating instructions from users via the input components 114. The operating instructions can comprise manually entered operating parameters for the lathe device 10. For example, the user may manually enter the frequency or amplitude for the cutter assembly 34, 36. In that case, the controller 110 can be configured to send instructions to the lathe device 10 causing the lathe device 10 to operate according to the manually entered parameters.

In other examples, as described in connection with step 410 in FIG. 4, the user enters information about the particles or powder to be produced. For example, the user can enter a target particle size or distribution of target particle sizes. The controller 110 can be configured to determine operating parameters for the lathe device 10 based on inputs received from users. For example, operating parameters can be determined or calculated from values in a lookup table or calibration curve and based on target particle size or distribution and a geometry of the workpiece. Once the new operating parameters are known or determined, the controller 110 can be configured to set or adjust operating parameters of the lathe device 10, so that the lathe device 10 operates according to the new operating parameters.

In some examples, the system 100 further comprises sensors 118, 120 electrically coupled to the controller 110. For example, the system 100 can include sensors 118 positioned on the lathe device 10 for scanning the workpiece 12. The sensors 118 can be mounted on the lathe device 10 in proximity to the cutter assemblies 34, 36 or retainer assembly 20. The sensors 118 can be optical sensors configured to obtain images of the workpiece 12. The images can be processed to determine, for example, a diameter and/or length of the workpiece 12. Information from the sensors 118 can be received and processed by the controller 110 to monitor changes is geometry of the workpiece 12 caused by the repeated contact with the cutter assemblies 34, 36.

The system 100 can also include sensors 120 positioned near to or in the collection vessel or hopper 44. The sensors 120 can be configured to detect information representative of characteristics of the produced particles. For example, the sensors 120 could be positioned near an opening of the collection vessel or hopper 44 so that particles falling into the collection vessel 44 pass within a field of view of the sensors 120. The sensors 120 can be configured to detect information about the particles passing through the field of view. For example, such sensors 120 can be configured to measure characteristics of the particles including average particle volume, median particle volume, particle volume distribution, or average sphericity of the particles. The system 100 can also include sensors 122 positioned in or associated with the hopper 44 for measuring qualities of the produced powder. For example, the sensors 122 can comprise a scale for measuring a total mass of the produced powder. The sensor 122 could also be configured to measure a total volume of the produced powder.

In some examples, the controller 110 can be configured to receive information detected by the sensors 118, 120, 122 and to adjust the operating parameters for the lathe device 10 based on the received information. In this way, information for the sensors 118, 120, 122 can be used as a feedback loop for optimizing or adjusting operation of the lathe device 10. For example, information about changes in geometry of the workpiece 12 can be used to update operating parameters of the lathe device 10 so that the lathe device 10 continues to produce particles of the target particle size. In particular, as discussed previously, the workpiece 12 diameter decreases due to formation of the particles from the workpiece 12. Operating parameters including amplitude and rotation rate may need to be adjusted to account for such changes in workpiece 12 diameter. Also, information from sensors 120, 122 in the collection vessel 44 can determine characteristics of the particles being produced. If, based on the detected information, the controller 110 determines that the average particle volume or size is different from an anticipated or target particle volume or size, the controller 110 can be configured to adjust the operating parameters of the lathe device 10 to account for such differences. For example, if the particles being produced are determined to be larger than a target particle size, the reciprocating frequency of the cutter assembly 34, 36 could be increased to reduce an amount of time that the cutter 38 is in contact with the workpiece 12. Similarly, an amplitude of the cutter assembly 34, 36 could be adjusted so that the cutter 38 does not press as far into the workpiece 12, thereby producing smaller particles.

User Interfaces for Powder Producing Systems

In some examples, the system 100 further comprises a user interface module 124 in wired or wireless communication with the controller 110. Generally, the user interface module 124 receives user inputs, such as inputs about target particle size and other particle characteristics. The controller 110 processes the inputs and, as described previously, can control operation of the lathe device 10 based, at least in part, on the received user inputs. The controller 110 can also provide notifications and feedback about the particles being formed and/or manufacturing process to the user interface module 124. For example, the controller 110 can emit notifications when different aspects of the manufacturing process have been completed. The controller 110 can also monitor progress of the powder forming process and provide, for example, estimates for time remaining. Such information and notifications can be provided to the user interface module 124. The user interface module 124 can cause a feedback device, such as a visual display 126, to provide the information to users.

The user interface 124 can include a number of application screens or pages for receiving inputs from and providing feedback to users. Examples of such screens are shown in FIGS. 6A-6C.

FIG. 6A shows an example of an initial input screen 610 for the lathe device 10. The initial input screen 610 can comprise a number of data entry fields allowing the user to enter information about a powder being produced. For example, the screen 610 can comprise one or more fields 612 for the user to enter a target particle size. The screen 610 can also include fields 614 for a user to specify what percentage of the particles should be a particular size. For example, as shown in FIG. 6A, a user can specify that 50% of particles should be about 25 μm and 50% of particles should be about 50 μm in diameter. The user can also enter inputs for the powder to be produced. For example, the screen 610 can include a field 616 for the user to enter a total mass of powder required. In some examples, the screen 610 can also include a section 618 for entering information about the workpiece 12 (e.g., a length and initial diameter of the workpiece), which can be used for determining operating parameters for the lathe device 10. In other examples, as discussed previously, information about the workpiece 12 can be determined automatically by sensors associated with the lathe device 10. In some examples, the section 618 can also include, for example, drop down lists or menus allowing the user to identify the source material (e.g., from a list including Aluminum, Stainless steel, Nickel Alloys, and Titanium). The section 618 can also include a drop down list or menu allowing the user to select a morphology for the particles to be produced. In some cases, certain operating parameters of the device 10 can be adjusted to increase the possibility that particles having a specified morphology are produced. As discussed previously, particles could also be modified by, for example, post-processing to obtain more specific particle morphologies.

FIG. 6B shows a screen 630 that can be provided to the user while the lathe device 10 is in use. For example, the screen 630 can be shown to a user to inform the user how the lathe device 10 is progressing in performing a power producing program using the user inputs provide in the screen 610. The in-use screen 630 can comprise a section 632 with cumulative information about the powder being produced. For example, the section 632 can include real time data for characteristics of the produced particles including average particle diameter, average particle volume, average sphericity, and similar information. The screen 630 can also include a section 634 with information about progress towards completing the program. For example, the section 634 could include information about a total mass or volume of powder produced so far. The section 634 could also include, for example, a count-down timer 636 showing an estimated time until the required total volume or mass of powder has been produced.

Figure 6C:
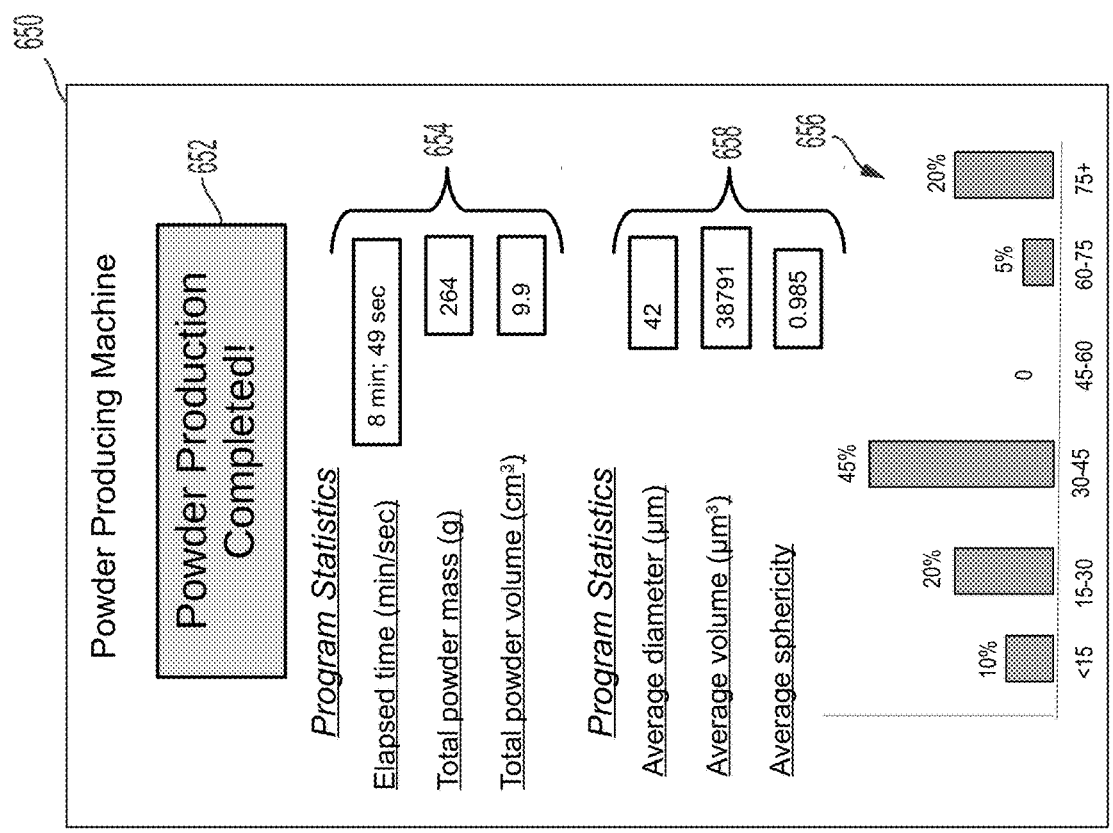

FIG. 6C shows a program complete screen 650, which can be displayed to a user after the lathe device 10 has completed preparing the powder according to the initial user inputs. The screen 650 can include, for example, a text notification 652 informing the user that the program has been completed. The screen 650 can further comprise a section 654 with statistics for the completed program including, for example, a total time required, total mass of powder produced, or total volume of powder produced. The screen 650 can further comprise, for example, a graph 656 showing, for example, the powder size distribution (PSD) for the produced powder. The screen 650 can also include a section 658 with information about the particles of the powder including, for example, average particle diameter, average particle volume, or average sphericity. The information about characteristics of the particles can be collected by sensors associated with the collection vessel 44, as described previously.

EXAMPLES

Particles were produced using the method disclosed herein, in which a feedstock of wrought metal was repeatedly contacted by a cutter device at a low ultrasonic frequency of about 20 kHz to produce a powder consisting of particles. The formed particles were about 50 μm to 75 μm in size. The formed particles were generally triangular in shape. However, it is believed that be optimization of operating parameters of the lathe device and/or post processing, spherical particles can be produced using the methods disclosed herein.

Figure 7C:
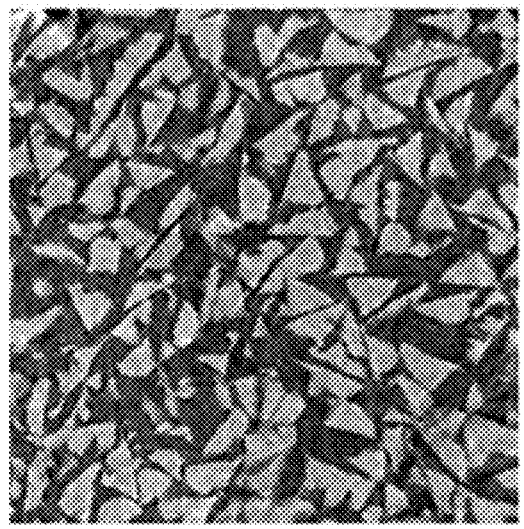
FIGS. 7A-7C are images produced by CT scans of powder particles formed according to the methods of the present disclosure.
Figure 7B:
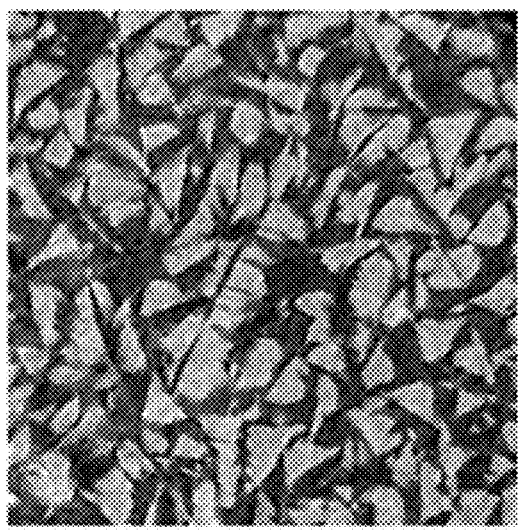
Figure 7A:
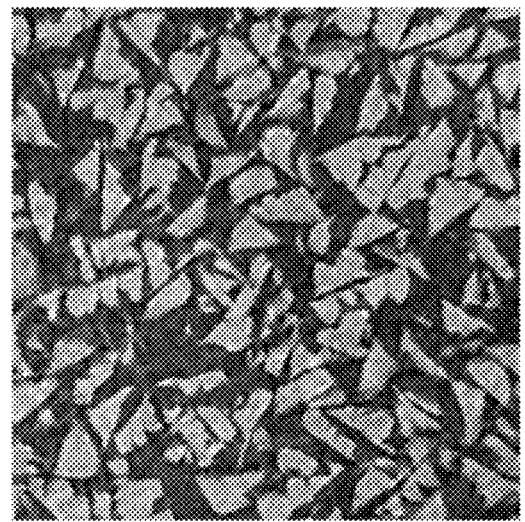

CT images from a 2 μm scan of the formed particles were captured and reviewed. The captured CT images are shown in FIGS. 7A-7C. The CT images showed that the formed particles looked clean in terms of porosity. In particular, no evidence of encapsulated (e.g., closed) porosity in the particles was observed.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A powder production method comprising:
providing an elongated workpiece comprising a first end, a second end, and a side surface extending between the first end and the second end; and
repeatedly contacting the side surface of the elongated workpiece with a plurality of reciprocating cutters according to a predetermined at least one frequency to produce a powder comprising a plurality of particles,
wherein the plurality of reciprocating cutters are aligned parallel to a longitudinal axis of the elongated workpiece and move in a direction orthogonal to the longitudinal axis of the elongated workpiece,
wherein the predetermined at least one frequency for the reciprocating cutters is at least 10 kHz, and
wherein at least 95% of the produced particles have a diameter or maximum dimension ranging from about 10 μm to about 200 μm.

2. The method of claim 1, wherein the elongated workpiece comprises a cast, wrought, or extrudable material.

3. The method of claim 1, wherein the elongated workpiece comprises a wrought metal rod comprising one or more of steel, nickel, aluminum, titanium, platinum, rhenium, niobium, and alloys thereof.

4. The method of claim 1, wherein the workpiece comprises at least one of uranium, rare earth elements, polymers, and ceramics.

5. The method of claim 1, wherein repeatedly contacting the workpiece with the plurality of reciprocating cutters according to the predetermined at least one frequency comprises contacting the workpiece according to a first frequency for a predetermined first time period followed by contacting the workpiece according to a second frequency different from the first frequency for a predetermined second time period, and
wherein the first frequency and the second frequency each are at least 10 kHz.

6. The method of claim 5, further comprising selecting a target particle size distribution comprising particles of a first target size and particles of a second target size and, prior to contacting the workpiece by the plurality of reciprocating cutters, determining the first time period and the second time period based on the selected particle size distribution.

7. The method of claim 1, wherein producing the powder does not introduce porosity to the particles, such that the plurality of particles have a porosity substantially the same as a porosity of the elongated workpiece.

8. The method of claim 1, further comprising rotating the workpiece at a selected rotation rate as the workpiece is contacted by the plurality of reciprocating cutters, wherein the rotation rate is determined based on a target particle size to be produced.

9. The method of claim 1, wherein repeatedly contacting the workpiece with the plurality of reciprocating cutters comprises contacting a first portion of the workpiece with a first cutter and contacting a second portion of the workpiece with a second cutter.

10. The method of claim 1, further comprising, after the powder is produced, spheroidizing the plurality of particles by applying at least one of heat, abrasive forces, and chemical agents to the particles.

11. The method of claim 1, further comprising exposing the workpiece to a laser while contacting the workpiece with the plurality of reciprocating cutters to assist in removing the plurality of particles from the workpiece.

12. The method of claim 1, further comprising, prior to contacting the side surface of the elongated workpiece with the plurality of reciprocating cutters, determining a geometry of the elongated workpiece based on measurements from one or more optical sensors that acquire images of the elongated workpiece, and determining the at least one frequency for the plurality of reciprocating cutters based, at least in part, on the determined geometry.

13. The method of claim 12, further comprising monitoring the geometry of the elongated workpiece as the plurality of particles are being produced with the one or more optical sensors, and adjusting the at least one frequency of the plurality of reciprocating cutters as the geometry of the elongated workpiece changes, or
further comprising moving the plurality of reciprocating cutters to contact different areas of the elongated workpiece when the elongated workpiece is not wearing evenly, as determined based on measurements by the one or more optical sensors.

14. The method of claim 1, further comprising:
adjusting the at least one frequency of the plurality of reciprocating cutters based, at least in part, on measurements from one or more sensors that measure characteristics of the produced powder,
wherein the one or more sensors are configured to detect at least one of the following characteristics of the produced powder: average particle volume, median particle volume, particle volume distribution, total powder weight, total powder volume, or average sphericity of the plurality of particles.

15. The method of claim 14, further comprising:
as the powder is being produced, receiving information about particles of the produced powder from the one or more sensors;
determining the average particle volume for the produced particles based on the received information from the one or more sensors; and
comparing the determined average particle volume of the particles to an anticipated or target particle volume,
wherein adjusting the at least one frequency of the plurality of reciprocating cutters comprises increasing or decreasing the at least one frequency based on the comparison between the determined average particle volume and the anticipated or target particle volume to cause the particle volume of the produced powder to become closer to the anticipated or target particle volume.

16. The method of claim 15, further comprising, as the powder is being produced, adjusting an amplitude of the plurality of reciprocating cutters relative to the elongated workpiece to account for changes in diameter of the elongated workpiece in order to maintain production of particles of the anticipated or target particle volume.

17. The method of claim 1, wherein the predetermined at least one frequency is about 20 kHz to about 30 kHz.

18. The method of claim 1, wherein the reciprocating cutters are driven at the at least one predetermined frequency by at least one resonant structure comprising a tuned sonotrode excited to the at least one predetermined frequency.

19. The method of claim 1, wherein the plurality of reciprocating cutters comprise cutters comprising a rounded leading edge that produce particles comprising a rounded tip, a round or elliptical base, and opposing curved sides extending between the base and the tip.

20. The method of claim 19, wherein the curved sides of the produced particles curve in multiple dimensions.

21. The method of claim 1, wherein the plurality of particles are produced at a rate of at least 160,000 particles per second.

* * * * *